United States Patent [19]
Kamata

[11] Patent Number: 4,610,512
[45] Date of Patent: Sep. 9, 1986

[54] MOUNTING FOR ZOOM LENS

[75] Inventor: Shigeru Kamata, Tokyo, Japan

[73] Assignee: Canon Kabushiki Kaisha, Tokyo, Japan

[21] Appl. No.: 663,962

[22] Filed: Oct. 23, 1984

[30] Foreign Application Priority Data

Oct. 28, 1983 [JP] Japan .................. 58-166159[U]

[51] Int. Cl.[4] .............................................. G02B 7/10
[52] U.S. Cl. .................................................. 350/429
[58] Field of Search ............................. 350/429, 430

[56] References Cited

U.S. PATENT DOCUMENTS

| 4,210,387 | 7/1980 | Ogawa ......................... 350/429 |
| 4,229,074 | 10/1980 | Nonogaki ..................... 350/429 |
| 4,472,032 | 9/1984 | Kamata et al. ............... 350/429 |

Primary Examiner—John K. Corbin
Assistant Examiner—Loha Ben
Attorney, Agent, or Firm—Toren, McGeady, Stanger, Goldberg & Kiel

[57] ABSTRACT

A mechanical mounting for a zoom lens in which a range of angles of rotation of a focusing actuator and a range of angles of zoom actuator are limited by a common stopper member.

2 Claims, 2 Drawing Figures

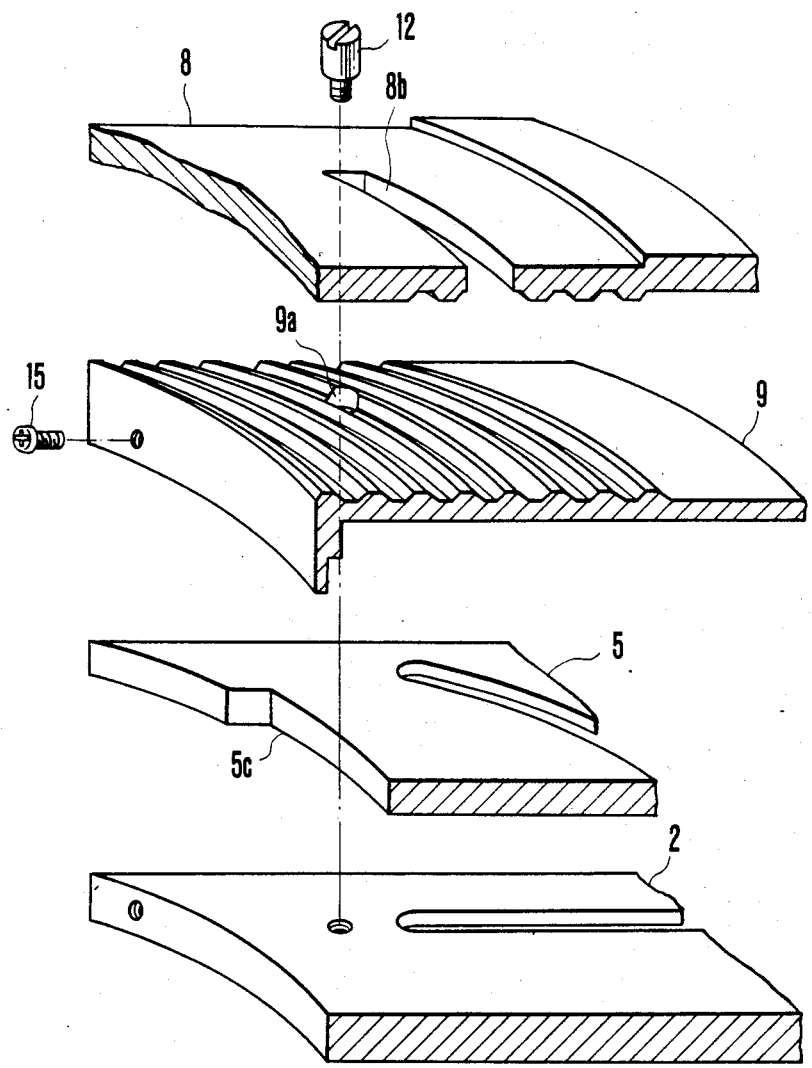

MOUNTING FOR ZOOM LENS

BACKGROUND OF THE INVENTION

1. Field of the Invention:

This invention relates to mechanical mountings for zoom lenses having focusing and zoom actuator rings rotatable independently of each other, and more particularly to the limitation of ranges of rotation of the aforesaid two rings by using a common stopper.

2. Description of the Prior Art:

The zoom lens mountings of this kind have been so constructed that a cutout of angular extent provided in the end of the rotatable zoom control cam sleeve cooperates with a stopper pin radially extending from the body tube to limit a zooming range, and either a cutout or an abutment provided in the distance adjusting ring cooperates with a stopper fixedly secured either to the body tube or to the second tube fixedly fitted on the body tube to limit a focusing range. Thus, there was need to use two stoppers and two locating members therefor. In the case when the stopper for the focusing ring was mounted to the second tube, there was further need to use relative angular position adjusting means between the body tube and the second tube. This led to increase the number of parts, the number of production techniques and the number of operations on the assembly line, giving rise to the disadvantages not only of increasing the production cost of the complete zoom lens mounting but also of creating a problem regarding the space necessary due to increase in the size of the outer barrel of the mounting and also making it difficult to maintain good manageability.

SUMMARY OF THE INVENTION

It is, therefore, an object of the present invention to eliminate the above-described drawbacks of the conventional mounting and to provide a mounting mechanism for a zoom lens with a single stopper sufficient for limiting the ranges of rotation of both the focusing and zoom actuator rings, whereby the complexity of structure and the production cost are reduced.

BRIEF DESCRIPTION OF THE DRAWINGS

FIG. 2 is a fragmentary exploded perspective view of the main parts of FIG. 1.

DESCRIPTION OF THE PREFERRED EMBODIMENTS

Figure 1:
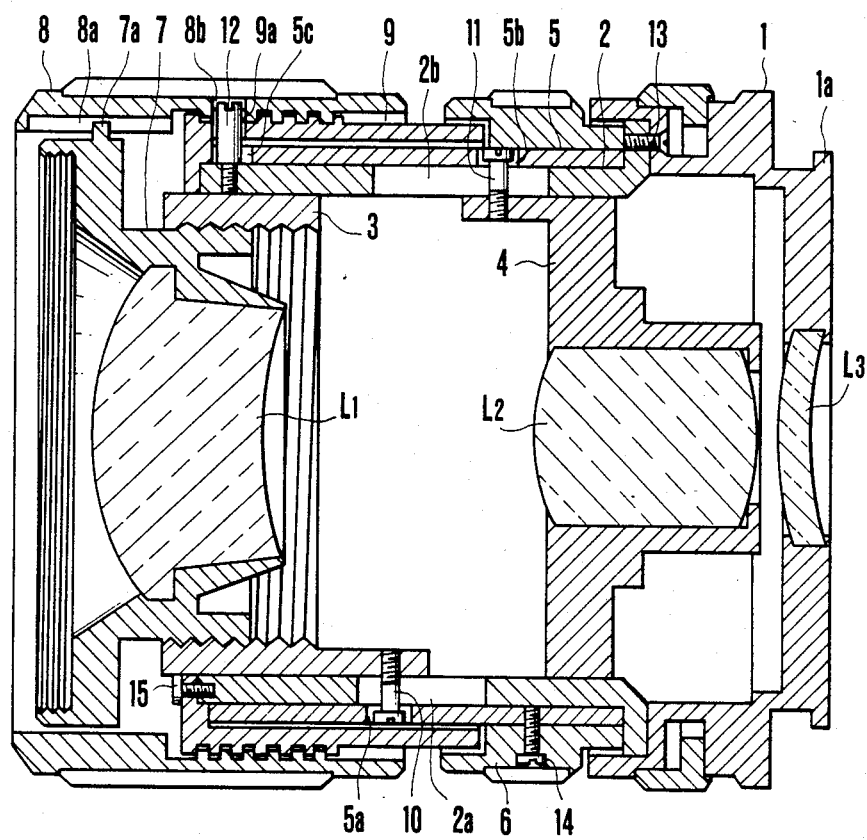
FIG. 1 is a longitudinal section view of an embodiment of a zoom lens mounting according to the present invention.

The present invention is described in the following in connection with an embodiment thereof by reference to the drawings. The mechanical mounting for a zoom lens comprises an adapter 1 having a coupler 1a for attachment to a camera body (not shown) and fixedly carrying a third lens component L3, a body tube 2 fixedly mounted to the adapter 1 by screw fasteners 13, a first movable sleeve 3 for a first lens component L1, a second movable sleeve 4 for a second lens component L2 the first and second sleeves being axially movably fixed in the inner diameter of the body tube 2, and a cam sleeve 5 rotatably fitted on the outer diameter of the body tube 2. Cam follower pins 10 and 11 extend radially outwardly respectively from the first and second sleeves 3 and 4 through axial guide slots 2a and 2b provided through the wall of the body tube 2 into camming slots 5a and 5b formed in the inner surface of the cam sleeve 5. Also formed in the front end of the cam sleeve 5 is a cutout portion 5c of an angular extent depending on the zoom range. A zoom actuator ring 6 is fixedly secured to the outer diameter of the cam sleeve 5 at the rear end thereof by a screw fastener 14.

The aforesaid first lens component L1 is contained in a first holder 7. A focusing actuator ring 8 is screw-threaded on the outer diameter of a second tube 9 which is fixedly mounted to the body tube 2 at the front end thereof by a screw fastener 15, and has an axial guide groove 8a formed in the front part of the inner surface thereof into which a radial projection 7a extends outwardly from the front part of the outer surface of the first holder 7.

12 is a common stopper for limiting the ranges of rotation of both the focusing and zoom actuator rings 8 and 6. The stopper 12 passes through a circumferential slot 8b provided in the focusing actuator ring 8, a penetration hole 9a of the second tube 9 and the cutout 5c of the cam sleeve 5 into engagement with the body tube 2 at the front end portion thereof. And, the circumferential slot 8b is slightly inclined to conform with the lead of the screw thread which functions to transform rotative movement of the focusing ring 8 into axial movement thereof.

The operation of the mechanical mounting is as follows: To begin with, when the zoom actuator ring 6 is turned, the cam sleeve 5 turns along therewith. Such rotative movement of the cam sleeve 5 is transmitted both through the cam follower 10 engaging in the arcuate and axial slots 5a and 2a to axial movement of the first sleeve 3 along with the first holder 7 and through the cam follower 11 engaging in the arcuate and axial slots 5b and 2b to axial movement of the second sleeve 4, whereby the focal length of the zoom lens is varied while maintaining the constant position of the image plane.

Next, when the focusing ring 8 is turned, the first holder 7 is also turned by the connection of the projection 7a with the axial guide groove 8a, moving axially forward or rearward relative to the first sleeve 3 by virtue of the lead of the helicoid screw thereof to effect focusing.

When either one of the ends of the circumferential slot 8b comes to abut on the stopper 12, the focusing ring 8 can be no longer turned. Thus, the range of rotation of the focusing ring 8 is limited.

Also the range of rotation of the zoom actuator 6 is limited when either one of the ends of the cutout 5c of the cam sleeve 5 abuts on the stopper 12.

Still another feature is that, though the penetration hole 9a has as its primary purpose accommodating the stopper 12, it may also be made to serve as a locating member when fine adjustment of the angular position of the second stationary tube 9 relative to the body tube 2 is required. For this purpose, the penetration hole 9a is so accurately bored that the stopper 12 snugly fits therein.

It is to be noted that though, in the illustrated embodiment, the rotation range limiting stopper 12 is formed with a cylindrical shape and is screw-threadedly fixed to the outer periphery of the body tube 2, it may be formed to another shape and positioned at the end of the body tube 2. Also the slot 8b of the focusing ring 8 may be otherwise formed to a groove.

As has been described above, the present invention makes it possible for a single stopper to limit different ranges of rotation of the focusing and zoom actuator rings, thereby reducing the number of parts, the number of production techniques and the number of assembling operations, and therefore, enabling manufacturing of the mechanical mountings for zoom lenses more economically. An additional advantage arising from the utilization of the stopper as the locating member for the combination of the body tube and the second stationary tube is that the assemblying operation of these two parts is simplified.

What is claimed is:

1. A mechanical mounting for a zoom lens, comprising:
   (a) a focusing lens and a lens holder for said focusing lens;
   (b) a zoom lens and a lens holder for said zoom lens;
   (c) a body tube having a guide slot;
   (d) a cam sleeve inserted into said body tube rotatable about an optical axis, and having a cam portion which intersects with said guide slot of said body tube;
   (e) cam follower means having a follower member which is fixed to the lens holder of said zoom lens and engaging with an intersection point of said cam portion and said guide slot;
   (f) a zoom actuator member for rotating said cam sleeve thus effecting a zooming operation;
   (g) a focusing actuator member rotatable about said body tube for shifting said focusing lens back and forth in the direction parallel to the optical axis; and
   (h) means for limiting an angle of rotation of said focusing actuator member and said zoom actuator member, said limiting means comprising a stopper mounted on said body tube, which extends through said cam sleeve and reaches said focusing actuator member,
      a cutout portion provided on said cam sleeve, which indicates a range of limitation of an angle of rotation which in turn determines a range of zooming, and
      a circumferential slot provided on said focusing actuator member, which indicates a range of limitation of an angle of rotation which in turn determines a range of focusing,
   said stopper being inserted into said cutout portion and said circumferential slot.

2. A mechanical mounting for a zoom lens, comprising:
   (a) a focusing lens and a lens holder for said focusing lens;
   (b) a zoom lens and a lens holder for said zoom lens;
   (c) a body tube having a guide slot;
   (d) a cam sleeve fitted with an outside of said body tube in an inserting manner rotatable about the optical axis, and having a cam portion which intersects with said guide slot of said body tube;
   (e) a follower member fixed to the lens holder of said zoom lens and engaging with an intersection point of said cam portion and said guide slot;
   (f) a zoom actuator member for rotating said cam sleeve to effect a zooming operation;
   (g) a focusing actuator member screw-threaded with a thread portion provided at a part of said body tube for shifting said focusing lens by its rotation; and
   (h) means for limiting an angle of rotation of said focusing actuator member and said zoom actuator member, said limiting means comprising:
      a cutout portion provided on an end plane of said cam sleeve for indicating a range of limitation of an angle of rotation of the cam sleeve;
      a slot provided on said focusing actuator member in a circumferential direction thereof in a matching arrangement with a lead of said thread portion; and
      a stopper which is fixed at said body tube and extends through said cutout portion and further is inserted into said slot of the focusing actuator member.

* * * * *